June 11, 1968  A. FEDER ET AL  3,387,456
AERODYNAMIC SHIELD DEVICE FOR VTOL JET AIRCRAFT ENGINE EXHAUST
Filed June 21, 1966
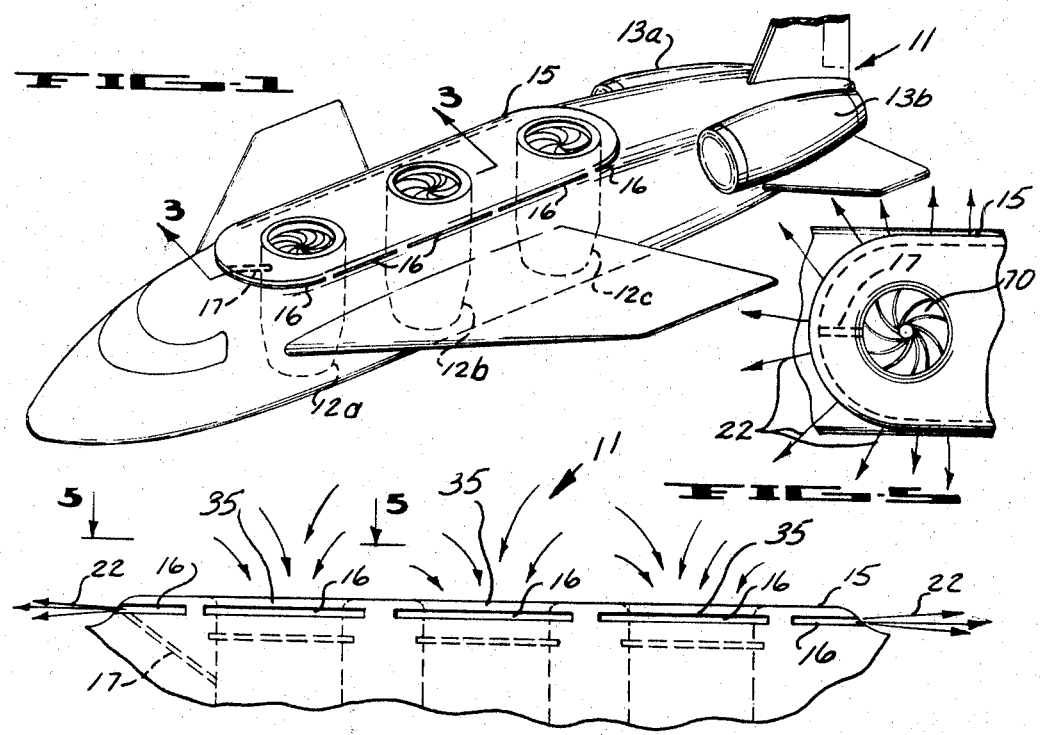
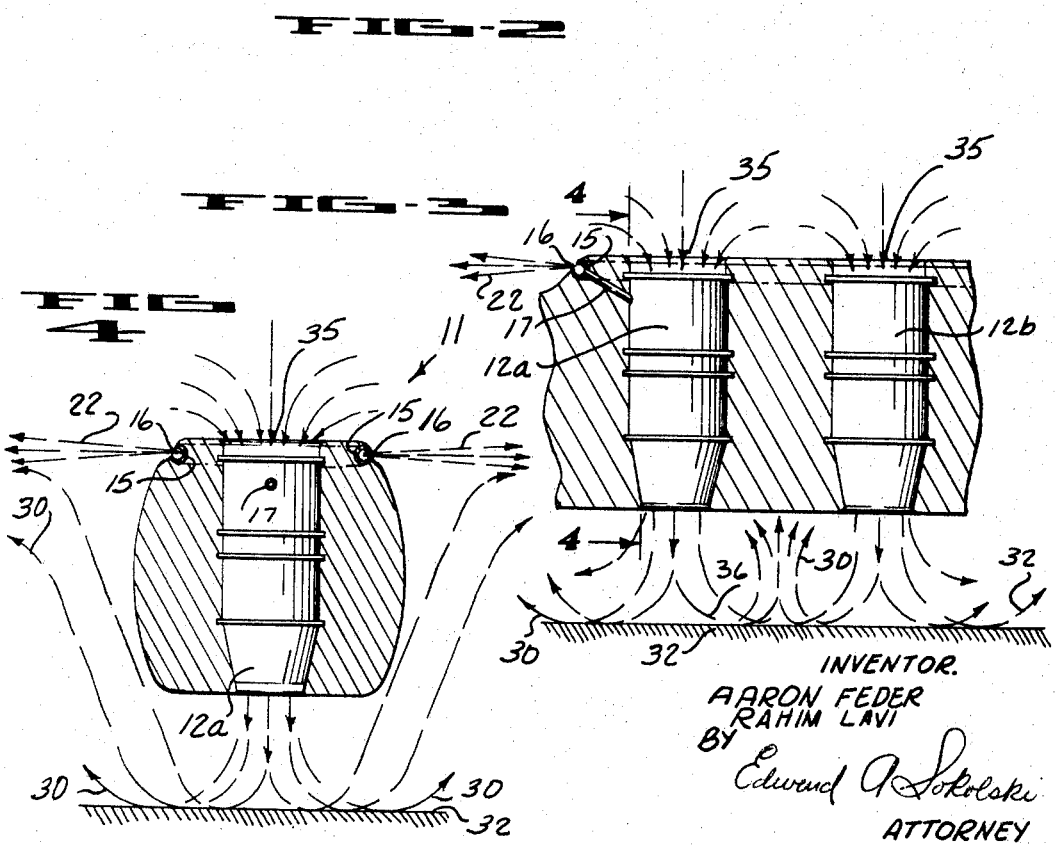
INVENTOR.
AARON FEDER
RAHIM LAVI
BY Edward A. Sokolski
ATTORNEY United States Patent Office 3,387,456
Patented June 11, 1968

3,387,456
AERODYNAMIC SHIELD DEVICE FOR VTOL
JET AIRCRAFT ENGINE EXHAUST
Aaron Feder and Rahim Lavi, Torrance, Calif., assignors to Northrop Corporation, Beverly Hills, Calif., a corporation of California
Filed June 21, 1966, Ser. No. 559,157
8 Claims. (Cl. 60—204)

This invention relates to an aerodynamic shield device for VTOL jet aircraft engine exhaust and more particularly to such a device for greatly increasing the efficiency of operation of the jet engines of such an aircraft and preventing the stalling of such engines during vertical lift-off.

In VTOL (Vertical Take Off and Landing) aircraft, of the jet powered type, jet engine power is utilized to vertically lift the aircraft off the ground. During the initial phases of aircraft lift-off, when the aircraft is just a few feet off the ground, it has been found that the jet exhaust is deflected upwardly by the ground and by jet interaction effects, and enters the air inlet of the lift engines. Such intake of exhaust gasses which are low in oxygen content greatly decreases engine efficiency, causing a serious loss of thrust which may culminate in engine stalling. This has posed a serious design problem in vertical lift-off jet engine design. Efforts thus far to solve this problem have involved either the utilization of engines having sufficient thrust to make up for the losses during vertical lift-off, or the angulating of the jet with respect to the horizontal. The former solution has the obvious disadvantages inherent in its inefficiency, while the latter approach provides a lift-off at an angle with respect to the horizontal and thus sacrifices the completely vertical lift-off to be desired.

The device of this invention provides means for enabling an absolutely vertical take-off by virtue of jet power without any significant loss of efficiency due to entry of exhaust gas into the intake during the initial phases of lift-off. This end result is achieved in the device of the invention without any significant increase in engine cost or complexity and without any significant sacrifice of engine efficiency. Despite the highly effective results achieved thereby, the device of the invention involves little or no modification to the engine design and can be readily incorporated into existing engines at a relatively low cost.

The desired end results are achieved in the device of the invention by providing a plenum chamber in the vicinity of the engine air intake, such plenum chamber having a narrow orifice which issues a jet of air radially outwardly therefrom. Compressed air is fed to the plenum chamber from a suitable source such as, for example, the engine compressor, auxiliary power units, or the like. The jet of air issuing forth from the plenum chamber orifice effectively forms an aerodynamic shield which deflects the hot exhaust gasses and thus prevents them from entering the engine inlet. In this manner the contamination of the inlet air is prevented during lift-off and a deterioration of engine efficiency during such operation is avoided.

It is therefore an object of this invention to improve the efficiency of vertical take-off jet lift engines without a significant modification of the aircraft.

It is another object of this invention to provide relatively simple and economical means for preventing the entry of exhaust gasses into the intake of a jet engine.

It is still another object of this invention to enable absolutely vertical lift-off in a VTOL aircraft utilizing jet powered lift-off engines.

It is still another object of this invention to provide means for deflecting engine exhaust gasses away from the engine intake by utilizing normally available compressed air.

Other objects of this invention will become apparent from the following description taken in connection with the accompanying drawings, of which FIG. 1 is a perspective view illustrating one embodiment of the device of the invention as installed in a VTOL aircraft, FIG. 2 is an elevational view illustrating the embodiment of the invention shown in FIG. 1, FIG. 3 is a cross-sectional view taken along the plane indicated by 3—3 in FIG. 1, FIG. 4 is a cross-sectional view taken along the plane indicated by 4—4 in FIG. 3, and FIG. 5 is a view taken along the plane indicated by 5—5 in FIG. 2.

Referring now to the drawings, VTOL aircraft 11 has jet engines 12a–12c mounted in the aircraft to provide thrust for vertical lift-off and jet engines 13a and 13b mounted horizontally in the aircraft to provide thrust for horizontal locomotion. Circling engines 12a–12c is plenum chamber 15 which may, as indicated, be in the form of metal tubing. Longitudinal slots 16 are formed in the walls of tubing 15 along substantially the entire longitudinal extent thereof, to form exit orifices for the plenum chamber. Compressed air is fed to plenum chamber 15 from the engine compressor 20 by means of connecting line 17.

Thus, with the device of the invention in operation, jets of air as indicated by arrows 22 are emitted radially outwardly through slots 16 to form a shield of air circumferentially surrounding the top portion of the engines 12a–12c. As can be seen in FIGS. 3 and 4, the shield of air formed by jets 22 operates to deflect the hot exhaust gasses indicated by arrows 30 which have been reflected upwardly by the ground 32 and by virtue of jet interaction effects. These hot exhaust gasses are thus prevented from entering the air intake of the engines, so that such intake receives only fresh relatively cool air from the ambient atmosphere, as represented by arrows 35.

It has been found in an operative model of the device of the invention that only .2–.5 percent of the total propulsion system airflow is needed from compressor 20 to achieve effective blockage of the hot exhaust gasses. This is so because the exhaust gasses by the time they approach the region of the engine intake have a velocity which is of the order of less than 100 feet per second. It is thus possible to deflect these exhaust gasses with an air jet having a relatively low velocity and mass.

The shield formed by air jets 22 is only needed during the initial stages of lift-off, until the aircraft has reached a height of about 10–20 feet off the ground, by which time the amount of exhaust gas approaching the air intake region of the engines is no longer of significant proportions. At this time, the supply of compressed air to plenum chamber 15 can be shut off by appropriate valving means (not shown) which may be located in line 17.

The technique of this invention thus provides simple yet highly effective means for greatly increasing the efficiency of operation of jet engines utilized for providing vertical lift-off. This increase in efficiency is achieved with negligible sacrifice of efficiency in normal flight and without elaborate or costly modifications to existing equipment.

While the device and technique of this invention has been described and illustrated in detail, it is to be clearly understood that this is intended by way of illustration and example only and is not to be taken by way of limitation, the spirit and scope of this invention being limited only by the terms of the following claims.

We claim:
1. In a VTOL aircraft, said aircraft including jet engine means for providing thrust for vertical lift off the ground, the improvement comprising means for generating an aerodynamic shield for blocking the entry of engine exhaust gasses into the air intake of said engine means comprising plenum chamber means located between the engine means exhaust and the engine means intake, and means for supplying compressed air to said chamber means, said chamber means having relatively narrow orifice means formed therein for directing a jet outwardly from said engine means in a plane substantially transverse to the longitudinal axis of said engine means to form a shield between said exhaust gasses and said engine air intake, said orifice means being symmetrically arranged about said engine means to provide insignificant net thrust thereon.

2. The device as recited in claim 1 wherein said plenum chamber means runs near the periphery of said engine means proximate to the air intake thereof.

3. The device as recited in claim 1 wherein said plenum chamber means is located immediately proximate to the engine means intake.

4. The device as recited in claim 2 wherein said plenum chamber means encircles said engine means.

5. The device as recited in claim 2 wherein said orifice means comprises elongated slot means formed in the outer wall of said chamber means for directing air jets radially from said chamber means.

6. The device as recited in claim 5 wherein said engine means comprises a plurality of engines positioned adjacent to each other and said plenum chamber means comprises a tube member encircling all of said engines.

7. The device as recited in claim 1 wherein said means for supplying compressed air to said chamber means comprises an engine compressor and a pneumatic line interconnecting said compressor and said chamber means.

8. A method for preventing the entry of exhaust gasses into the air intake of the vertical thrust engine of a VTOL aircraft comprising channelling a supply of compressed air into a plenum chamber located between the exhaust and the air intake of the engine, and ejecting said air outwardly from said chamber symmetrically about the longitudinal axis of said engine in a plane substantially transverse to said engine to form an aerodynamic shield between the exhaust gasses and the air intake of said engine.

References Cited
UNITED STATES PATENTS

| | | | |
|---|---|---|---|
| 2,527,732 | 10/1950 | Imbert | 60—226 |
| 3,022,026 | 2/1962 | Shaw | 244—23 |
| 3,024,601 | 3/1962 | Nash | 60—226 |
| 3,040,524 | 6/1962 | Kurti | 60—226 |
| 3,069,848 | 12/1962 | Griffith | 60—226 |
| 3,153,906 | 10/1964 | Marchant | 60—226 |

CARLTON R. CROYLE, *Primary Examiner.*

D. HART, *Assistant Examiner.*